United States Patent
Cameron

(10) Patent No.: US 8,255,916 B2
(45) Date of Patent: Aug. 28, 2012

(54) APPARATUS, AND ASSOCIATED METHOD, FOR ALLOCATING PROCESSING AMONGST DATA CENTERS

(75) Inventor: Alex Cameron, Surrey Downs (AU)

(73) Assignee: Hewlett-Packard Development Company, L.P., Houston, TX (US)

( * ) Notice: Subject to any disclaimer, the term of this patent is extended or adjusted under 35 U.S.C. 154(b) by 1171 days.

(21) Appl. No.: 12/100,775

(22) Filed: Apr. 10, 2008

(65) Prior Publication Data
US 2009/0260014 A1 Oct. 15, 2009

(51) Int. Cl.
*G06F 9/44* (2006.01)
*G06F 15/16* (2006.01)

(52) U.S. Cl. .......... 718/104; 718/105

(58) Field of Classification Search .......... None
See application file for complete search history.

(56) References Cited

U.S. PATENT DOCUMENTS

| | | | |
|---|---|---|---|
| 7,213,065 B2 * | 5/2007 | Watt | 709/223 |
| 7,653,009 B2 * | 1/2010 | Watsen et al. | 370/254 |
| 7,742,830 B1 * | 6/2010 | Botes | 700/32 |
| 7,844,839 B2 * | 11/2010 | Palmer et al. | 713/300 |
| 2001/0049741 A1 | 12/2001 | Skene et al. | |
| 2004/0230848 A1 | 11/2004 | Mayo et al. | |
| 2005/0044301 A1 | 2/2005 | Vasilevsky et al. | |
| 2005/0228618 A1 * | 10/2005 | Patel et al. | 702/188 |
| 2006/0129675 A1 * | 6/2006 | Zimmer et al. | 709/225 |
| 2007/0282915 A1 * | 12/2007 | Vosshall et al. | 707/200 |

FOREIGN PATENT DOCUMENTS

WO 2005101195 A3 10/2005
WO 2007016001 A2 2/2007

OTHER PUBLICATIONS

Notification of Transmittal of the International Search Report and the Written Opinion of the International Searching Authority, or the Declaration dated Aug. 12, 2009 from counterpart PCT application serial No. PCT/US2009/040074 filed Apr. 9, 2009 (pp. 4).
Written Opinion of the International Searching Authority, dated Aug. 12, 2009 from counterpart PCT application serial No. PCT/US2009/040074 (pp. 5).
International Search Report, dated Aug. 12, 2009 from counterpart PCT application serial No. PCT/US2009/040074 (pp. 3).
Hodges, R. "Greening The data Center" a Green IT Consulting Report, 2007, pp. 1-5. (http://web.archive.org/web/*/http://greenit.net/downloads/GreenIT-Greening-Data-Center-5-Step-Process.pdf).

* cited by examiner

*Primary Examiner* — Eric Coleman

(57) ABSTRACT

Apparatus, and an associated method, for facilitating optimization of data center performance. An optimization decision engine is provided with information regarding energy credentials of the power generative facilities that power the respective data centers. The energy credential, or other energy indicia, information is used in an optimization decision. Responsive to the optimization decision, processing allocation is made.

21 Claims, 3 Drawing Sheets

APPARATUS, AND ASSOCIATED METHOD, FOR ALLOCATING PROCESSING AMONGST DATA CENTERS

The present invention relates generally to a manner by which efficiently to perform processing at one or more data centers. More particularly, the present invention relates to an apparatus, and an associated method, by which to allocate processing responsive to an optimization decision. The optimization decision takes into account energy information at the data center.

The energy information includes energy-credential information, e.g., information identifying whether, and what portion of, the energy used to power each data center, is renewable. Additional energy information includes, e.g., processing capacity levels at each of the data centers, and energy surplus information. Optimization of allocations is better made to better alleviate the problems associated with peak loading and better able to take advantage of use of energy sources that exhibit better energy credentials.

BACKGROUND OF THE INVENTION

Technological advancements have permitted the development of computer systems and networks that provide for the collection, processing, and storage of data. Many business, and other, enterprises require ready access to computer systems to perform the collection, processing, and storage of the data.

Groups of computer stations are sometimes interconnected to form local area networks (LANs), and groups of local area networks are sometimes interconnected to form wide area networks (WANs). The Internet is sometimes functionally represented as a public WAN. A computer server is a computer station that, typically, has a large storage capacity and, at least selectably permits data stored thereat to be accessed and data to be written thereto. Computer servers are relatively costly, particularly when needed to store large amounts of data with many read and write operations performed thereon. Additionally, the data is sometimes of a proprietary or confidential nature. And, multiple servers are sometimes used, e.g., to provide for redundancy. For both security and cost reasons, the data servers, as well as other computer system devices, are sometimes maintained at a data center. The data center is maintained at controlled ambient temperature and humidity levels to ensure that the ambient conditions at the data center do not interfere with operation of the computer stations installed thereat. And, a data center is easily made to be limited access, both to personnel and to access to the computer servers and other devices thereat.

A data center is typically provided by way of one or more power grids through which electrical power is transmitted by one or more regional power providers. A data center is sometimes constructed at a location at which redundant power sources are available.

Recent concerns have been directed towards the level of carbon emissions of power-generative facilities that generate electrical power. Various studies and models indicate that carbon emissions are a cause of, or contributing factor in, global warming. Various efforts are starting to be made to provide incentives to use power generated by power facilities that emit lesser levels of carbon emissions. Renewable energy sources, such as energy sources that generate power from wind energy or water energy. The use of such alternate energy sources, when substituted for use of high, carbon-emotive energy sources, shall hopefully help emiliarate the trend of the higher average global temperatures.

In some regulatory schemes, power generation is privatized, and consumers of electrical power are provided choice in the electrical power provider. Different electrical power providers might have different production costs and corresponding price rates. And, different power providers might generate power in different manners, each with a different carbon foot print, i.e., level of carbon emissions. In other regulatory jurisdictions, consumers of electrical power do not have an opportunity to select from amongst different electrical power providers.

A large business, or other, enterprise sometimes has multiple data centers positioned at disparate locations, sometimes even on different continents. Different ones of the data centers might well be provided with electrical power generated by different electrical power providers. And, different ones of the data centers might have different processing capacities and different processing availabilities, depending on any of various factors.

Processing that is to be preformed by the enterprise might be carried out at any of the different data centers. The selection of data centers at which to perform the processing has, to date, not generally taken into account the carbon emissions of the power generative facility that provides the different ones of the data centers with electrical power.

If a manner could be provided by which to make data-center, processing selection that takes into account carbon emissions of the power-generative facilities that provide power to the data centers, carbon emissions associated with the operation of a data center could be reduced.

It is in light of this background information related to processing of data that the significant improvements of the present invention have evolved.

SUMMARY OF THE INVENTION

The present invention, accordingly, advantageously provides an apparatus, and an associated method, by which efficiently to perform processing at one or more data centers.

Through operation of an embodiment of the present invention, a manner is provided by which to allocate processing responsive to an optimization decision. The optimization decision takes into account energy information at the data center.

In one aspect of the present invention, the energy credential information that is used when making the optimization decision includes, e.g., information that identifies whether, and in what portion, that the energy used to power a data center, is renewable. By taking into account the carbon emissions of an electrical power generative facility, a decision can be made to allocate processing at a data center that utilizes power generated by a power generative facility that exhibits good, or best-available, energy credentials.

In another aspect of the present invention, an optimization decision engine is provided. The optimization decision engine is adapted to receive data-center information that identifies data-center energy indicia. The data-center information includes information relating to all of the data centers at which the processing might be performed. That is to say, information is provided to the optimization decision engine relating to each of an entire group of possibly-available data centers. The group of data centers comprise, for instance, all of the data centers of an enterprise, connected together by way of network connections.

In another aspect of the present invention, the data-center energy indicia provides indication of energy-source information. The energy-source information comprises, for instance, an identifier that identifies the type of electric-power generative facility that powers the associated data center. If a data center is positioned at a location permitting its powering by more than one power grid, viz., is capable of being provided with operative power generated by more than one type of electrical power-generative facility, the energy-source indicia indicates all of the alternate, possible sources.

The optimization decision engine decides, based upon the information provided thereto, at where to perform processing. By taking into account the energy-source indicia when deciding at what data center to perform the processing, improved decision optimization is provided.

The energy-source indicia identifies, for instance, the portion, or percentage, of the generated power that is generated by a renewable energy source. The identification is alternately made, or additionally made, responsive to energy credential information included in the, or forming, the energy-source indicia.

In another aspect of the present invention, the data center information that is provided to the optimization decision engine further includes data-center utilization indicia. The data-center utilization information identifies, for instance, the availability of capacity at an associated data center. The optimization decision made by the optimization decision engine further takes into account the available capacity at the data centers. If a data center does not have capacity to take on additional processing, the data center is not further considered irrespective of the energy credentials, or other energy indicia, also associated with the data center. In further implementations, additional, or other, information is further provided and used by the optimization decision engine and is used pursuant to the optimization decision made thereat. The additional information includes, for instance, operating capabilities and parameters associated with the associated data center.

In another aspect of the present invention, once an optimization decision is made, processing allocation is then made in accordance with the optimization decision. If, for instance, the optimization decision is a decision to perform processing at a remote data center, rather than a local data center, the processing is allocated to the selected, remote data center.

In another aspect of the present invention, when a distributed data scheme is utilized, data is distributed amongst a plurality of data centers. Pursuant to, or responsive to, the allocation of the processing, distributed hash tables, DHTs, are formed and used to facilitate the transfer of the processing to another data center. Alternately, a scalable, distributed data system or scheme, S/DDS, is utilized pursuant to the transfer of the processing.

By taking into account the energy credentials of the power that powers a data center, allocation of processing is able to be made to facilitate reduction in carbon emissions.

In these and other aspects, therefore, an apparatus, and an associated method, is provided for facilitating allocation of processing amongst data centers. An optimization decider is adapted to receive data-center information that identifies data-center energy indicia. The optimization decider is configured to decide an optimal data-center processing capability responsive to the data-center information that identifies the data center energy indicia. An allocator is configured to allocate the processing amongst the data centers responsive to decision made by the optimization decider.

A more complete appreciation of the scope of the present invention and the manner in which it achieves the above-noted and other improvements can be obtained by reference to the following detailed description of presently preferred embodiments taken in connection with the accompanying drawings that are briefly summarized below, and by reference to the appended claims.

DETAILED DESCRIPTION

Figure 1:
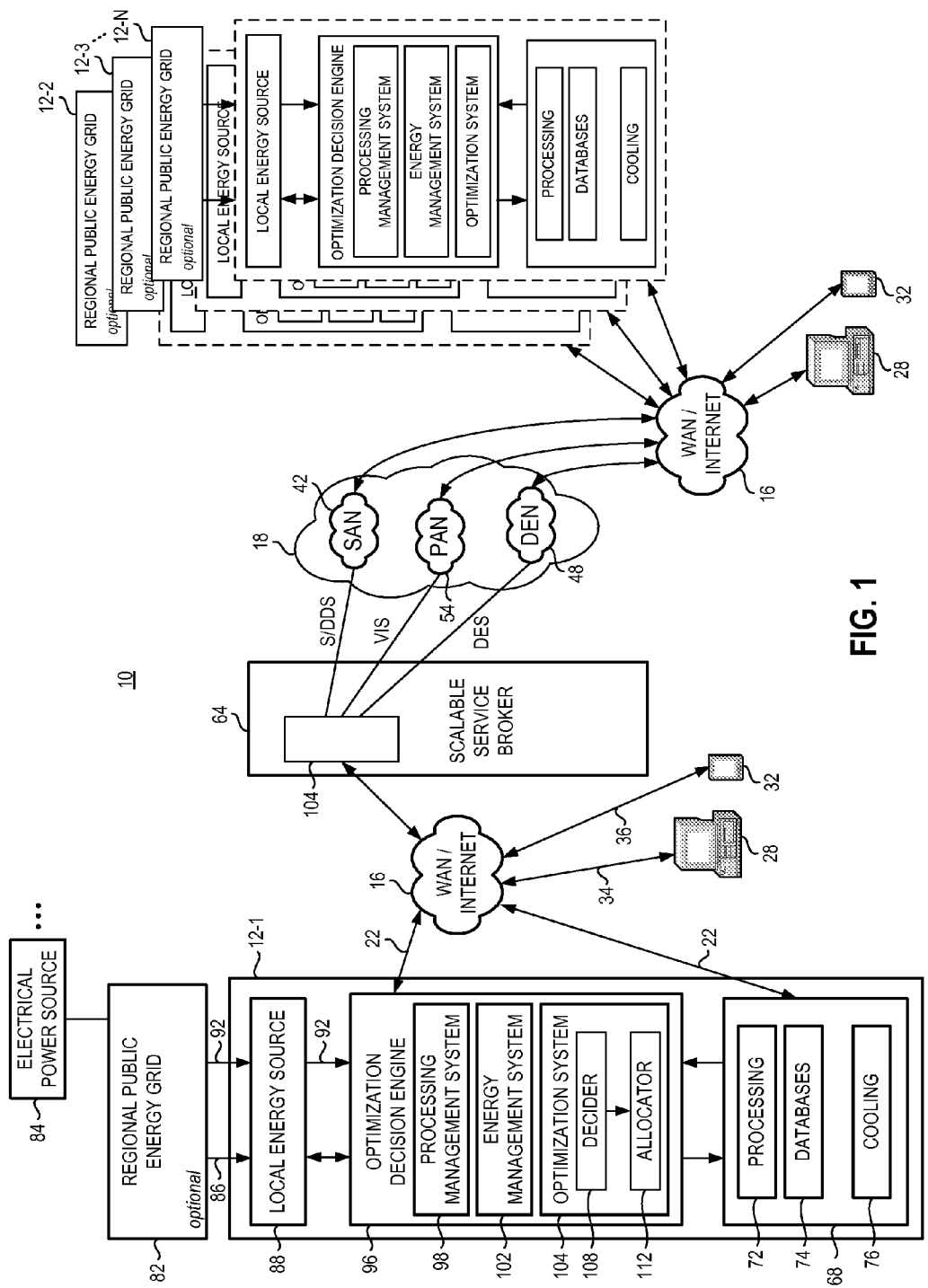
FIG. 1 illustrates a functional block diagram of an arrangement of interconnected data centers and at which an embodiment of the present invention is operable.

Referring first to FIG. 1, an arrangement shown generally at 10, includes a plurality of data centers 12, here including a local data center 12-1 and remote data centers 12-2, 12-3, and 12-N. The data centers are, in the exemplary implementation, positioned at disparate locations, even e.g., on different continents. In the exemplary implementation, the data centers are operated by a common business, or other, enterprise. More generally, the arrangement of data centers is representative of any group of interconnected data centers, whether commonly operated or wholly independently operated.

The data centers 12 are connected together by way of network connections, here represented by wide area networks (WANs) 16 and, here, an MPLS. (Multi Protocol Label Switching)/internet network 18. Exemplary paths 22 extend between the data center 12-1 and the WAN 16. Analogously, lines 24 extend between the data centers 12-2 through 12-N and the WAN 16.

Additional devices are connectable to the wide area network 16 including, for instance, data center users 28 positioned at, e.g., computer work stations. And, EDGE (Enhanced Data for GSM Evolution) wireless users 32, using, e.g., data-capable, wireless devices, are also connectable to the wide area network. The users 28 and 32 are selectable permitted access to devices at the data centers 12. The lines 34 are representative of connections between the computer stations used by the data center users 28 and the wide area network 16. And, the lines 36 are representative of connections between the wireless devices used by the users 32. The lines 36 are here representative of radio channels defined upon a radio air interface.

The MPLS/Internet Network 18 is here shown further to include a storage area network (SAN) 42, a processing area network (PAN) 44 and a discretionary energy network (DEN) 48. Lines 52, 54, and 58 extend between the SAN 42, the PAN 44, and the DEN 48, respectively, and the wireless access network 16.

In the exemplary implementation, a service broker entity 64 further forms part of the arrangement 10. The service broker is a scalable entity and is positioned in connectivity with the wide area network 16 and with the MPLS/Internet Network 18.

The data center 12-1, functionally represented, is typically implemented at a segregated work area at which the ambient environment is controlled. That is to say, the data center is maintained at controlled temperature and humidity levels. Most generally, the data center forms an area that includes physical entities 68 here including processing entities 72, data bases 74, and cooling entities 76. A processing entity 72 is implemented by computer processing circuitry, data bases 74 are maintained at computer mass storage devices, and the cooling entity 76 comprises, e.g., a cooler installed at the data center. While FIG. 1 illustrates the physical entity 68 only at the data center 12-1, analogous structure is also embodied at the other data centers 12.

The data center 12 is provided with electrical power by way of an energy grid 82, here a regional public energy grid with electrical power sourced at one or more electrical power generative facilities 84. Power is here represented to be applied to the data center by way of the line 86. A local energy source 88 embodied at the data center is representative, in the exemplary implementation of a self-sustaining, DC, supply system. Alternately the source 88 comprises of apparatus that receives the electrical power transported upon the power grid 82. The local energy source acts a pass-through, a power converter, or a local store of energy, available, e.g., in the event of power failure.

The electrical power generated by the power generative facility, or facilities, 84 has an associated carbon emission indicia. The carbon emission indicia identifies, such as by percentage or other numerical value, indicative of the carbon emissions. An indicia of the carbon emissions, here indicated by an energy goodness and availability line 92, is provided to the data center.

The data center includes an apparatus 96 that forms an optimization decision engine of an embodiment of the present invention. The optimization decision engine formed of the apparatus 96 includes a processing management system 98, an energy management system 102, and an optimization system 104. The optimization system includes an optimization decider 108 and an allocator 112. While the apparatus 96 is shown at the data center 12-1, analogous entities are formed at other data centers, or elsewhere. In an alternate embodiment, the optimization decision engine is implemented at other physical entities, e.g., separate from the data center 12.

The optimization decider 108 of the optimization system 104 is provided with information pertaining to the data center 12-1 as well as corresponding information associated with others of the data centers. That is to say, the optimization decider is provided with information related to the local data center as well as, also, the corresponding information of at least one remote data center. The information includes the energy indicia, i.e., the indication of the carbon emissions associated with the electrical power provided to the data center as well as, in the exemplary implementation, additional information. The additional information comprises, e.g., an indication of processing utilization at the associated data center, availability of processing capacity, or other appropriate indicia that indicates the availability of processing capacity. The optimization decider makes an optimization decision based upon the information provided thereto as to at where to perform processing. And, an indication of the decision is provided to the allocator 112. In an exemplary scenario, data is distributed amongst a plurality of data centers, such as to increase data redundancy. In the event that the optimization decision is a decision to perform processing at a different location, the allocator performs hashings to form distributed hash tables (DHTs) or performs other techniques based upon distributed hash tables, such as a technique associated with scalable/distributed data systems (S/DDTs) layered upon a normal S.A.N. (Storage Area Network) technology. And, upon formation of the distributed hash tables, or the like, the processing is transferred to the selected data center. And, in accordance with the allocation, processing commences at the selected data center.

In one implementation, decision made by the optimization decider further is made to balance better the processing amongst the participating data centers. Through balancing of the processing, cooling and processing is balanced and processing availability is better optimized.

In one implementation, the service broker includes the optimization system 104 having decider and allocator functionality analogous to that described with respect to the system 104 embodied at a data center 12. In this implementation, the decision and allocation is made by the broker. The operation of the broker is initiated, for instance, by a data center.

In the exemplary implementation, when the optimization decider makes a decision to move data, or perform processing, at a remote data center, the data is moved with virtual images. And, by taking into account the environmental credentials associated with the power source, processing is moved to the data center powered by an energy source that offers the best credentials, as well as cost and reliability. Additionally, the system facilitates enablement of the concept of discretionary loads for data centers by allowing excess processing to be moved to another data center, thereby taking advantage of energy surpluses, and thereby balancing energy demands and reducing peak power demands.

Thereby, a model of self sustainable data centers that behave like a single integrated system that is sensitive to the best use of energy is provided. Problems of managing power stations for peak load are reduced and the carbon emission associated with the processing is reduced.

Figure 2:
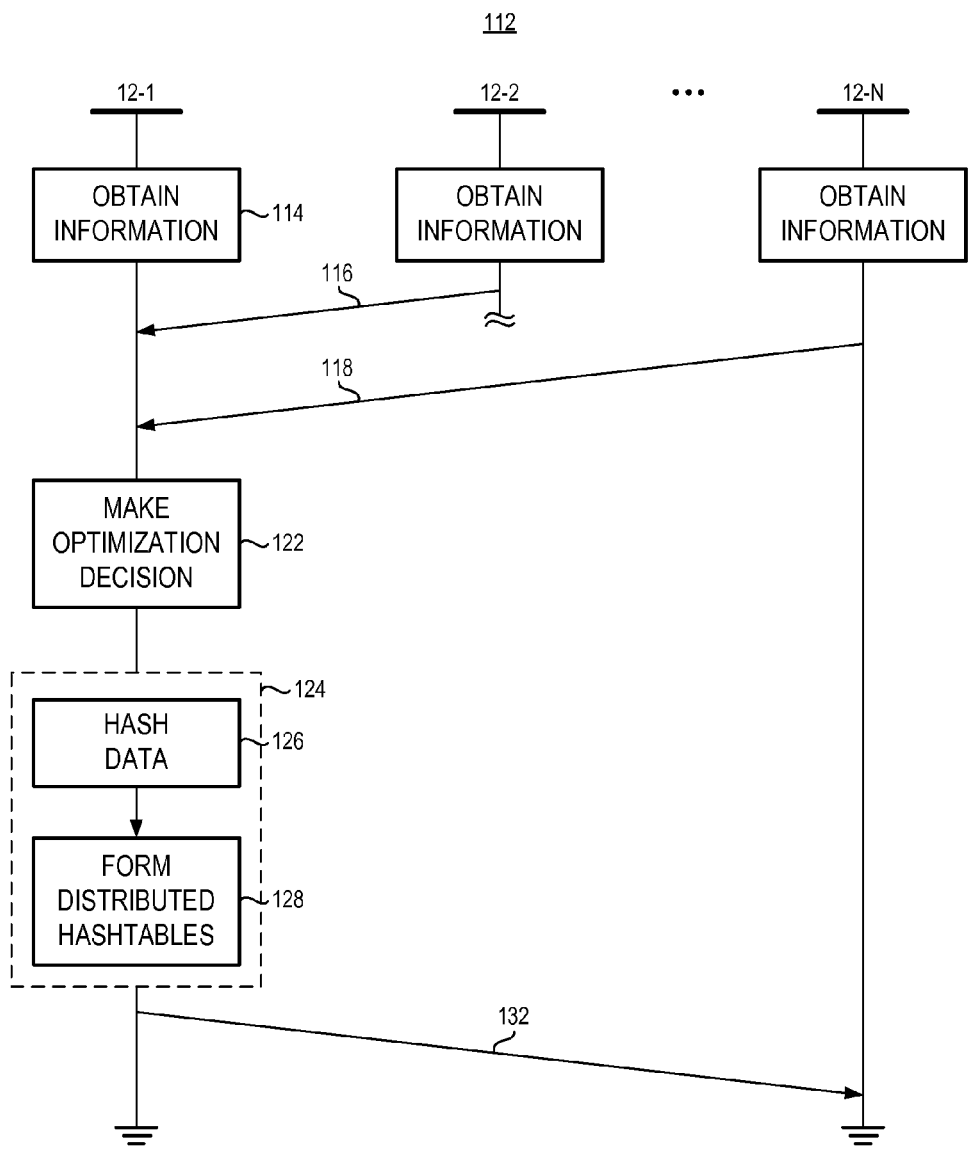
FIG. 2 illustrates a process diagram representative of the process of operation of an embodiment of the present invention.

FIG. 2 illustrates a process diagram shown generally at 112, representative of the process of operation of an embodiment of the present invention by which to optimize data center performance through discretionary use of energy and processing capacity. A group of data centers 12-1 through 12-N are positioned in communication connectivity. The processes described with respect to the data center 12-1, here referred to as the local data center. Analogous operation is carried out at others of the data centers. In this exemplary implementation, the optimization decision and allocation is made at a data center. In an alternate implementation, and as noted previously, the optimization is performed at a broker entity.

First, and as indicated by the blocks 114, at each respective data center, information regarding the data center is obtained. The obtained information includes the energy credentials of the power generative facility that powers the data center as well as other appropriate information, such as processing availability and capacity at the respective data centers. The segments 116 and 118 are representative of information signals containing the information obtained at the remote data centers that are sent by way of communication connections, such as internet connections, to the local data center.

Responsive to the received information, an optimization decision is made, indicated by the block 122. The optimization decision includes decision of at where to perform processing, i.e., at the local data center 12-1 or one of the other data center, responsive to the optimization decision processing allocation, indicated by the block 124. Pursuant to the allocation, and as indicated by the block 126, hashing of data is performed to form distributed hash tables, indicated at the block 128. And, the processing data is moved, indicated by the segment 132 to the selected data center, here the data center 12-N. In an implementation in which the broker is utilized, the functions 122 and 124 are carried out at a broker rather than at a data-center entity.

Figure 3:
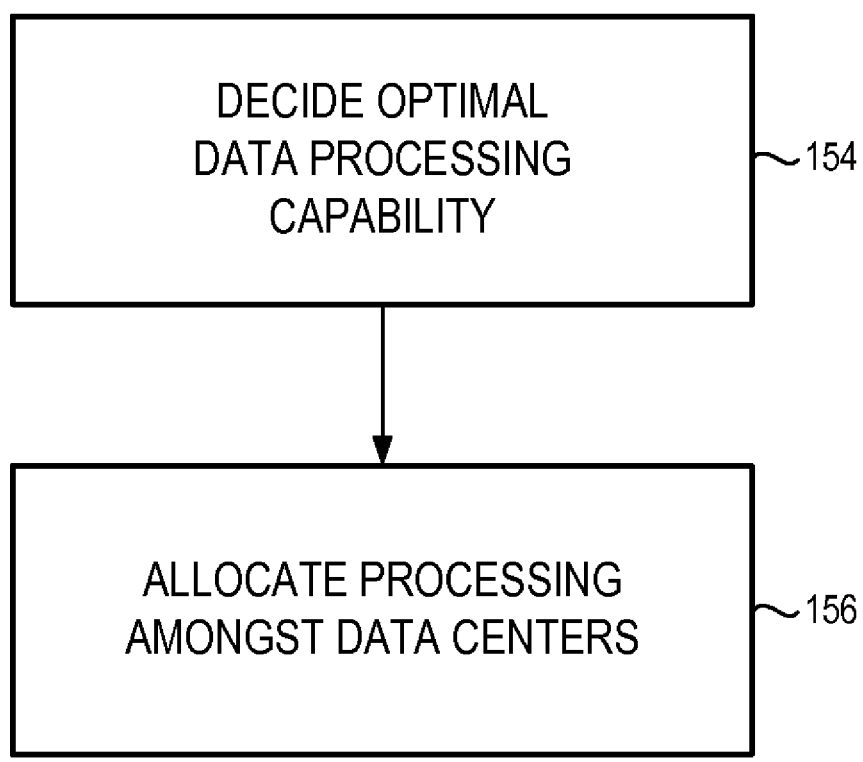
FIG. 3 illustrates a method flow diagram representative of the method of operation of an embodiment of the present invention.

FIG. 3 illustrates a method flow diagram, shown generally at 152, representative of the method of operation of an embodiment of the present invention. The method facilitates operation of processing among data centers.

First, and as indicated by the block 154, an optimal data center processing capability is decided responsive to data center information that identifies data center energy indicia.

Then, and as indicated by the block 156, processing is allocated amongst the data centers responsive to the optimal data center processing capability.

Because the decision that is made has to where to perform the processing is dependent upon the energy credentials of the power that is used to power the data centers, a decision is able to be made that is sensitive to the carbon emissions generated as a result of processing and the operation of the data centers.

Presently preferred embodiments of the invention and many of its improvements and advantages have been described with a degree of particularity. The description is of preferred examples of implementing the invention and the description of preferred examples is not necessarily intended to limit the scope of the invention. The scope of the invention is defined by the following claims.

What is claimed is:

1. An apparatus for facilitating allocation of processing amongst data centers, said apparatus comprising:
   an optimization decider adapted to receive data-center information that identifies data-center energy indicia for each of the data centers, the data-center energy indicia comprising an indication of carbon emissions associated with electrical power provided to an associated one of the data centers, said optimization decider configured to decide optimal data-center processing allocation amongst the data centers responsive to the data-center information, that identifies the data center energy indicia, and
   an allocator configured to allocate the processing amongst the data centers responsive to decision made by said optimization decider.

2. The apparatus of claim 1 wherein said optimization decider is adapted to receive data-center information that identifies energy-source indicia, said optimization decider configured to decide optimal data-center processing responsive, in part to the energy-source indicia.

3. The apparatus of claim 2 wherein the energy-source indicia comprises a renewable energy component of sourced energy.

4. The apparatus of claim 1 wherein said optimization decider is adapted to receive data-center information that identifies energy credential indicia, said optimization decider configured to decide optimal data-center processing responsive, in part, to the energy credential information.

5. The apparatus of claim 1 wherein said optimization engine is further adapted to receive data-center information that identifies data-center utilization indicia, said optimization decider configured to decide optimal data-center processing allocation further responsive to the data-center information that identifies the data-center utilization indicia.

6. The apparatus of claim 5 wherein the data-center utilization indicia comprises data-center processing availability.

7. The apparatus of claim 1 wherein the data-center information that identifies the data-center energy indicia comprises data-center information that identifies data-center energy availability.

8. The apparatus of claim 1 wherein the data centers comprise a local data center and a first remote data center and wherein said allocator is configured to allocate the processing amongst the local data center and the first data center.

9. The apparatus of claim 8 wherein the local data-center power supply and wherein the first remote data center is powered by a first-remote-data-center power supply, the data-center energy indicia is identified in the data-center information received by said optimization decider related to both the local-data-center power supply and the first-remote-data-center power supply.

10. The apparatus of claim 1 wherein said allocator is further configured to utilize Distributed Hash Tables, DHI, to effectuate the processing in accordance with allocations of the processing.

11. The apparatus of claim 1 wherein said allocator is further configured to utilize a scalable/distributed data system, S/DDS, to effectuate the processing in accordance with allocations of the processing.

12. A method for facilitating allocation of processing amongst data centers, said method comprising:
    deciding an optimal data-center processing allocation amongst the data centers responsive to data-center information that identifies data-center energy indicia, the data-center energy indicia comprising an indication of carbon emissions associated with electrical power provided to an associated one of the data centers; and
    allocating the processing amongst the data centers responsive to the optimal data-center processing allocation decided during said deciding.

13. The method of claim 12 wherein said deciding comprises deciding the optimal data-center processing allocation responsive to data-center information that identifies energy-source indicia.

14. The method of claim 13 wherein the energy-source indicia comprises a renewable energy component of sourced energy.

15. The method of claim 12 wherein said deciding further comprises deciding the optimal data-center processing allocation further responsive to data-center information that identifies data-center utilization indicia.

16. The method of claim 15 wherein said allocating comprises allocating the processing responsive to a combination of the data-center information that identifies the data-center energy indicia and the data-center information that identifies the data-center utilization indicia.

17. The method of claim 12 further comprising distributing processing allocated during said allocating using distributed hash tables.

18. The method of claim 17 further comprising performing hashing upon data to form the distributed hash tables.

19. The method of claim 17 wherein said distributing processing further comprises utilizing an XML, Extensible Markup Language, Protocol.

20. An apparatus for a data center of a distributed group of data centers, said apparatus comprising:
    a decision engine configured to decide which data center of the distributed group of data centers to utilize pursuant to a data center operation, decision made by said decision responsive to a carbon-emission, energy-credential information related to each data center of the distributed group; and
    a distributor configured to distribute a data-center task of the data center responsive to decision made by said decision engine.

21. An apparatus for facilitating allocation of processing amongst data centers, said apparatus comprising:
    an optimization decider adapted to receive data-center information that identifies data-center energy indicia said optimization decider configured to decide optimal data-center processing capability responsive to the data-center information, that identifies the data center energy indicia, wherein the data-center information that identifies the data-center energy indicia comprises data-center information that identifies data-center energy availability, and an allocator configured to allocate the processing amongst the data centers responsive to decision made by said optimization decider.

\* \* \* \* \*